(12) United States Patent
Zafar et al.

(10) Patent No.: US 8,510,333 B2
(45) Date of Patent: Aug. 13, 2013

(54) METHODS, SYSTEMS, AND APPARATUS FOR DEVELOPING WIDGETS

(75) Inventors: Shahzib Zafar, Coppell, TX (US); Japan A. Mehta, Irving, TX (US); Enrique Ruiz-Velasco, Flower Mound, TX (US); Laxmi M. Patel, Irving, TX (US); Prabhakar Mani, Coppell, TX (US); Tulasi Kumar Neeli, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 780 days.

(21) Appl. No.: 12/347,814

(22) Filed: Dec. 31, 2008

(65) Prior Publication Data
US 2010/0169755 A1    Jul. 1, 2010

(51) Int. Cl.
*G06F 7/00* (2006.01)
(52) U.S. Cl.
USPC .......................................... 707/779; 715/762

(58) Field of Classification Search
USPC ................. 707/790, 791, 792, 779; 715/760, 715/761, 763, 764, 765
See application file for complete search history.

(56) References Cited

U.S. PATENT DOCUMENTS

| | | | |
|---|---|---|---|
| 2007/0226734 A1* | 9/2007 | Lin et al. | 717/177 |
| 2008/0034309 A1* | 2/2008 | Louch et al. | 715/766 |
| 2008/0081700 A1* | 4/2008 | Biniak et al. | 463/42 |
| 2008/0307385 A1* | 12/2008 | Dreiling et al. | 717/108 |
| 2011/0099487 A1* | 4/2011 | Pyhalammi et al. | 715/762 |

* cited by examiner

*Primary Examiner* — Amy Ng (57) ABSTRACT

An exemplary computing system may receive input identifying a first data source. The computing system may also provide a widget template and receive a request to associate the first data source with the widget template. The computing system may create a map that associates the first data source with the widget template. The computing system may provide a widget that displays, based on the map and the widget template, data from the data source. Corresponding methods, apparatus, and computer-readable media are also disclosed.

21 Claims, 9 Drawing Sheets

METHODS, SYSTEMS, AND APPARATUS FOR DEVELOPING WIDGETS

BACKGROUND INFORMATION

Widgets are specialized Graphical User Interface ("GUI") applications that provide visual information and/or access to frequently-used functions. Widgets may include clocks, calendars, news aggregators, calculators, music players, desktop notes, and a variety of other GUI objects. While many types of widgets are already available, the possibilities for developing and customizing widgets are seemingly endless.

Unfortunately, traditional widget development may be prohibitive for some users and enterprises. Traditional widget development may require computer-programming skills and knowledge about a platform for which a widget is being developed. A user without the requisite skills may not be able to develop widgets, and even if a user has the requisite skills, traditional widget development may be time consuming. Furthermore, traditional widget development may result in buggy widgets that may not function properly.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

The present disclosure is directed to systems, methods, and apparatus for developing widgets. The term "widget," as used herein, generally refers to any GUI application that provides visual information and/or access to one or more computing functions. Widgets may include clocks, calendars, games, news aggregators, calculators, music players, desktop notes, and/or any other suitable GUI objects. Widgets may provide time and date information, news, weather information, system utilization information, email information, instant message information, volume control functions, application control functions, search functions, power control functions, calendaring functions, and/or any other suitable information or function.

In an exemplary process for developing widgets, a development subsystem may display a representation of a widget template. The development subsystem may receive input identifying a data source and may receive a request to associate the data source with the widget template. The development subsystem may create a map that associates the data source with the widget template. The development subsystem may provide a widget that displays, based on the map and the widget template, data from the data source. These and other components and functions of methods, systems, and apparatus for developing widgets are presented in the following detailed description and the accompanying drawings.

Figure 1:
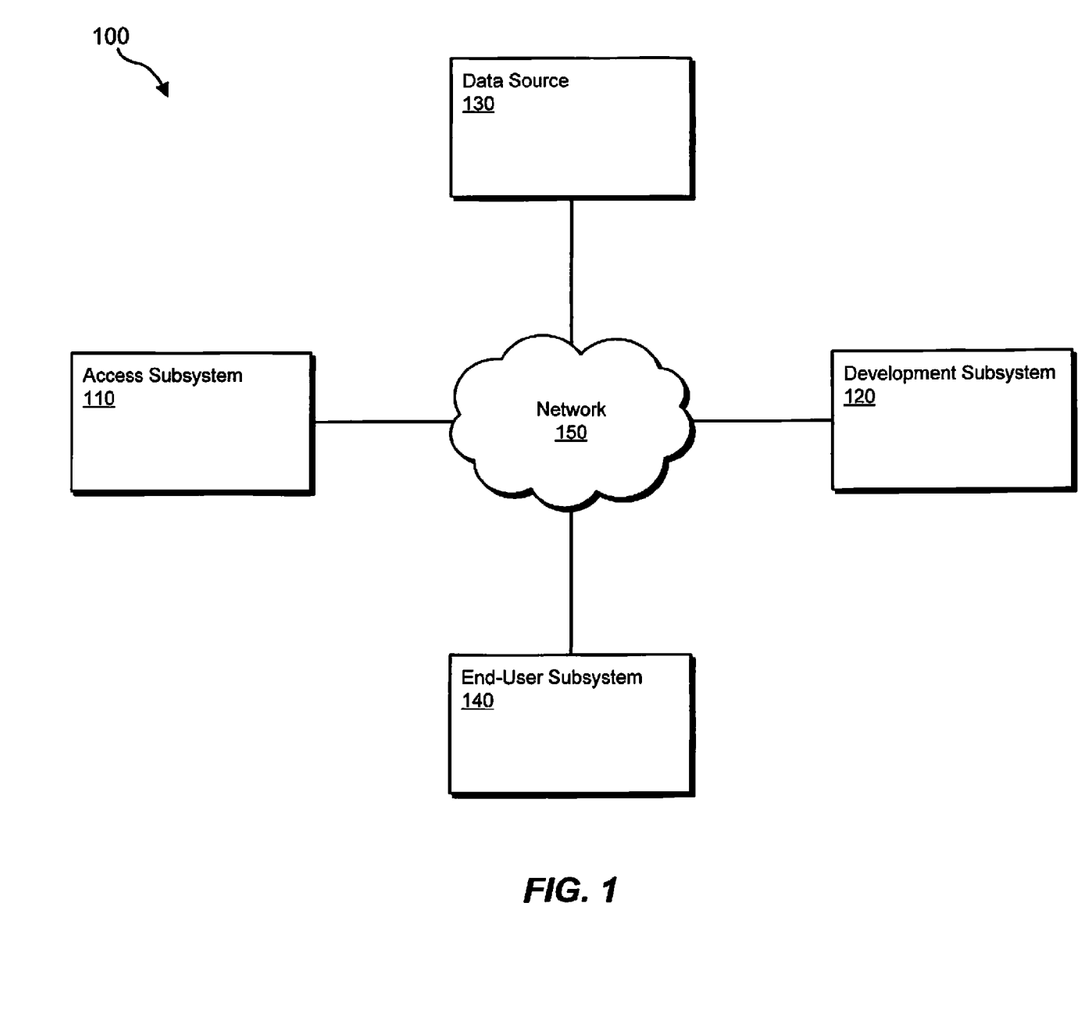
FIG. 1 is a block diagram of an exemplary system for developing widgets.

FIG. 1 illustrates an exemplary system 100 for developing widgets. The components of system 100 may include or be implemented as hardware, computing instructions (e.g., software) embodied on at least one computer-readable medium, or a combination thereof. Accordingly, system 100 may be referred to as a "computing system." System 100 may include an access subsystem 110, a development subsystem 120, a data source 130, an end-user subsystem 140, and a network 150.

Access subsystem 110 may include any hardware and/or software configured to communicate with development subsystem 120 in relation to development of a widget. For example, access subsystem 110 may include a desktop computer, a laptop computer, a workstation, a mobile computing device, and/or any software or device programmed to communicate with development subsystem 120. Access subsystem 110 may be configured to display a widget-development GUI, such as the GUIs shown in FIGS. 6-8. Access subsystem 110 may additionally or alternatively be configured to receive and send user input to development subsystem 120.

Development subsystem 120 may include or be implemented on any computing device and may be configured to perform one or more of the widget development steps disclosed herein. For example, development subsystem 120 may include an application server, a software development framework, a desktop computer, a laptop computer, a mobile computing device, and/or any other computer hardware or software that may be used in developing widgets. For example, development subsystem 120 may be programmed to maintain data representative of one or more GUIs for developing widgets, maintain one or more widget templates, receive input identifying a data source, and/or receive a request to associate the data source with a widget template.

In some embodiments, development subsystem 120 may send data representative of one or more GUIs for displaying a widget template to access subsystem 110, and access subsystem 110 may send development subsystem 120 input identifying a data source and/or a request to associate the data source with the widget template. In other embodiments, development subsystem 120 may include or may be connected to a display device and/or one or more input devices (e.g. a mouse, a keyboard, etc.). In such embodiments, development subsystem 120 may display one or more GUIs on the display device and may receive input directly from an input device. Thus, in some embodiments, a user may develop widgets directly on development subsystem 120 rather than accessing development subsystem 120 indirectly through access subsystem 110.

Data source 130 may provide data to widgets developed by development subsystem 120. Data source 130 may include any source that provides data that may be displayed in a widget. For example, data source 130 may include a web feed, such as an RSS feed or an atom-syndication-format feed. Data source 130 may also include a web site, a web page, or any other object identified by a Uniform Resource Locator ("URL"), a Uniform Resource Identifier ("URI"), and/or a Uniform Resource Name ("URN").

Data from data source 130 may be in any suitable format. For example, data from data source 130 may be in a markup-language format, such as an eXtensible Markup-Language ("XML") format, a HyperText Markup Language ("HTML") format, an eXtensible HyperText Markup Language ("XHTML") format, a Generalized Markup Language ("GML") format, and/or a Standard Generalized Markup Language ("SGML") format.

End-user subsystem 140 may include or be implemented on any computing device and may be configured to receive and display one or more widgets from development subsystem 120. For example, end-user subsystem 140 may include a desktop computer, a laptop computer, a mobile computing device, a workstation, a media-content-processing subsystem, and/or any other computer hardware or software capable of receiving and/or displaying widgets. In some embodiments, end-user subsystem 140 may receive data from data source 130 and may display the data in a widget. End-user subsystem 140 may include one or more platforms configured to access data from data source 130 and display widgets. Widget platforms may include, for example, WINDOWS operating systems, WINDOWS LIVE systems, GOOGLE DESKTOP, MAC operating systems, LINUX operating systems, communication device systems (e.g., mobile phone systems), Verizon® One® systems, and/or Verizon® FIOS® systems.

Network 150 may facilitate communications between access subsystem 110, development subsystem 120, data source 130, and/or end-user subsystem 140. Network 150 may use any known communication technologies, devices, networks, media, and protocols supportive of remote data communications, including, but not limited to, cable networks, subscriber television networks, satellite networks, the Internet, intranets, local area networks, wide area networks, metropolitan area networks, wireless networks (e.g., wi-fi and/or mobile telephone networks), optical fiber networks, data transmission media, communication devices, Transmission Control Protocol ("TCP"), Internet Protocol ("IP"), File Transfer Protocol ("FTP"), telnet, Hypertext Transfer Protocol ("HTTP"), Real Time Protocol ("RTP"), User Datagram Protocol ("UDP"), Ethernet, and/or any other suitable communications networks and technologies.

Figure 2:
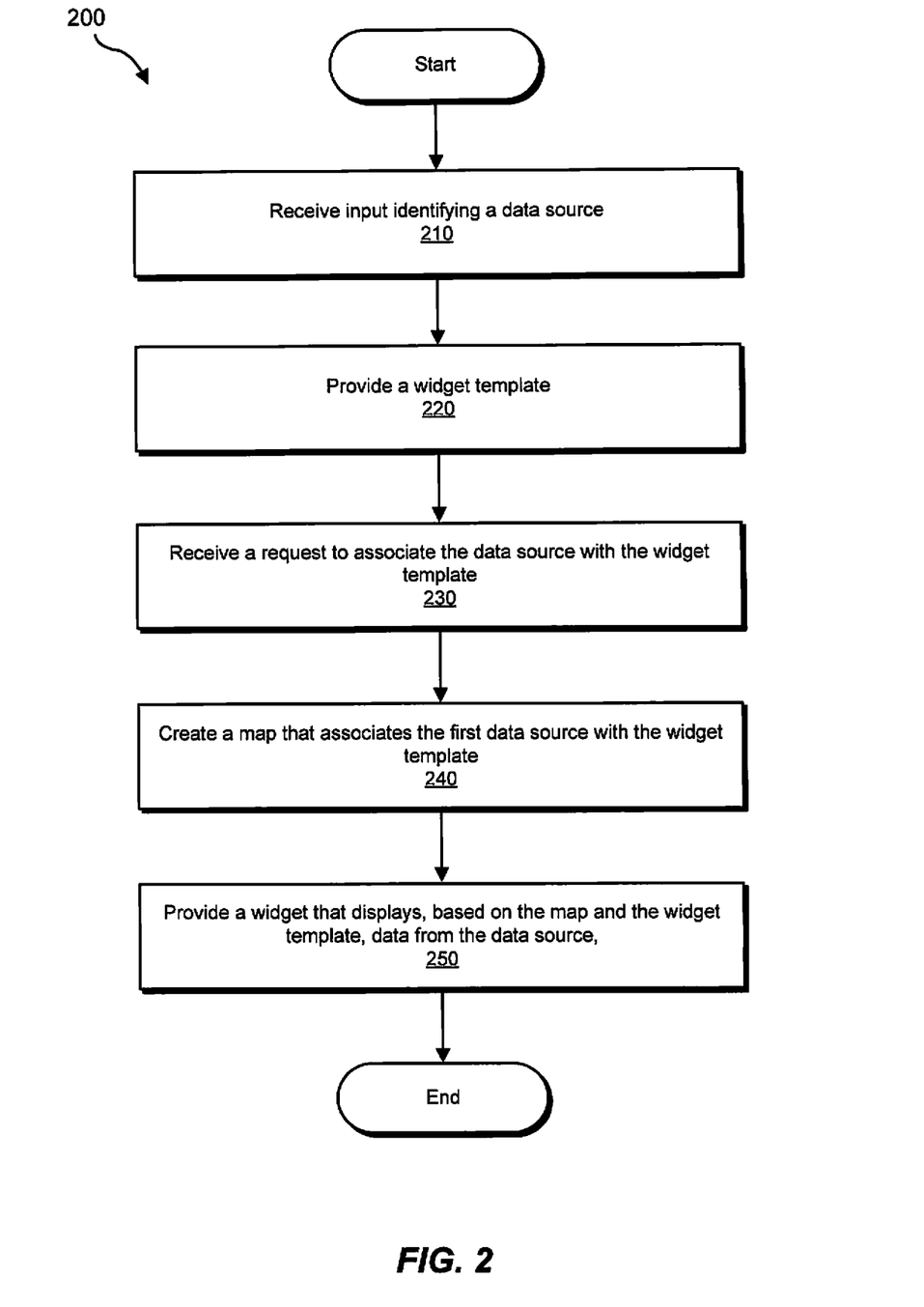
FIG. 2 is a flow diagram of an exemplary method for developing widgets.

FIG. 2 shows an exemplary method 200 for developing a widget. The steps shown in FIG. 2 may be performed by any suitable hardware, computing instructions, or combination thereof. For example, development subsystem 120 may perform one or more of the steps illustrated in FIG. 2. In one example, development subsystem 120 may receive input identifying a data source such as data source 130 (step 210). Development subsystem 120 may receive the input from access subsystem 110, from an input device directly connected to development subsystem 120, from a GUI, and/or from any other computing device or software capable of providing input to development subsystem 120.

In some embodiments, the input identifying data source 130 may include a data-source identifier, such as a URL. For example, a user may input a data-source identifier into an input field of a GUI provided by development subsystem 120, and the GUI may communicate the data-source identifier to development subsystem 120. In other embodiments, the input identifying data source 130 may include information identifying a user's data-source selection. For example, a GUI provided by development subsystem 120 may display representations of a plurality of data sources. The plurality of data sources may include data source 130. A user may select a representation of data source 130, and the GUI may communicate the user's selection to development subsystem 120.

In some embodiments, development subsystem 120 may provide a widget template (step 220). Development subsystem 120 may provide the widget template by causing a display device to display the widget template to a user. For example, development subsystem 120 may send the widget template to access subsystem 110, and access subsystem 110 may display the widget template. In other embodiments, development subsystem 120 may send the widget template to a display device directly connected to development subsystem 120.

The widget template may include any computer-executable code and/or data that may provide a template for developing a widget. For example, the widget template may define a layout for one or more customizable fields and/or one or more predefined objects. In some embodiments, the widget template may include one or more title fields, one or more image fields, one or more description fields, one or more graphics field, one or more data fields, and/or any other customizable widget field. The widget template may additionally or alternatively include one or more title objects, one or more image objects, one or more description objects, one or more graphics objects, one or more data objects, and/or any other predefined widget object. In some embodiments, the layout of fields and/or objects in a widget template may be fixed. In other embodiments, the layout of fields and/or objects in a widget template may be customizable.

Development subsystem 120 may receive a request to associate data source 130 with the widget template (step 230). The request may include any communication to development subsystem 120 indicating that data source 130 should be associated with the widget template. For example, development subsystem 120 may provide a GUI that displays both a representation of data source 130 and the widget template, and a user may provide input through the GUI indicating that data source 130 should be associated with the widget template.

The GUI provided by development subsystem 120 may also include a mapping mechanism. The mapping mechanism may be any mechanism configured to facilitate creation of a map that associates data source 130 with the widget template. For instance, the mapping mechanism may include code that enables a user to drag and drop a representation of data source 130 onto a representation of the widget template to initiate a request to associate data source 130 with the widget template.

In some embodiments, the request to associate data source 130 with the widget template may include a request to associate data source 130 with a field of the widget template. For example, data from data source 130 may be organized in a data structure having one or more nodes. The request to associate the data source 130 with the widget template may include a request to associate a data node of the data structure with a field of the widget template. In certain embodiments, the request to associate data source 130 with the widget template may include a request to associate multiple nodes of the data structure with multiple fields of the widget template.

After receiving the request to associate data source 130 with the widget template, development subsystem 120 may create a map that associates data source 130 with the widget template (step 240). The map may include any data structure that associates data source 130 with the widget template. For example, the map may include a markup-language document (e.g., an XML document) or a database entry.

In some embodiments, development subsystem 120 may create the map by mapping one or more data-structure nodes of data from data source 130 to one or more fields of the widget template. For example, data source 130 may include a web-feed source and the data-structure nodes of data from data source 130 may include markup-language tags. In such embodiments, development subsystem 120 may create the map by mapping a first markup-language tag to a first field of the widget template and mapping a second markup-language tag to a second field of the widget template. In some embodiments, development subsystem 120 may create the map by mapping data source 130 to a first field of the widget template and mapping a second data source to a second field of the widget template.

In certain embodiments, development subsystem 120 may repeat one or more of steps 210-240 to associate one or more additional data sources with the widget template. For example, in addition to receiving input identifying data source 130 (i.e., a first data source), development subsystem 120 may receive input identifying a second data source. Development subsystem 120 may receive a request to associate the second data source with the widget template. For example, development subsystem 120 may receive a first request to associate the first data source with a first field of the widget template and a second request to associate the second data source with a second field of the widget template. Development subsystem 120 may create a map that associates the first data source with the first field of the widget template and associates the second data source with the second field of the widget template.

After creating the map, development subsystem 120 may provide a widget that displays data from data source 130 based on the map and the widget template (step 250). For example, development subsystem 120 may provide the widget by using the map and the widget template to create an executable program comprising the widget. In such embodiments, development subsystem 120 may provide the executable program to end-user subsystem 140, which may display the widget by running the executable program. In other embodiments, the widget may include the map and the widget template. In such embodiments, development subsystem 120 may provide the map and the widget template to end-user subsystem 140, which may use the map and the widget template to render the widget.

In certain embodiments, the widget may include only the map, and the map may include template-identification information that identifies the widget template. In such embodiments, development subsystem 120 may send only the map to end-user subsystem 140. End-user subsystem 140 may use the template-identification information in the map to identify the widget template associated with the map. In some embodiments, end-user subsystem 140 may store and access the widget template locally. In other embodiments, end-user subsystem 140 may access the widget template through a remote subsystem (e.g., a remote template database that includes one or more templates). End-user subsystem 140 may use the map and the widget template to render the widget.

In some embodiments, development subsystem 120 may provide the widget by making the executable program, the map, and/or the widget template available to end-user subsystem 140 and/or any other subsystem. Development subsystem 120 may additionally or alternatively provide the widget by sending the executable program, the map, and/or the widget template to end-user subsystem 140 and/or any other subsystem. For example, development subsystem 120 may provide the widget by publishing the widget to a directory of widgets.

Figure 3:
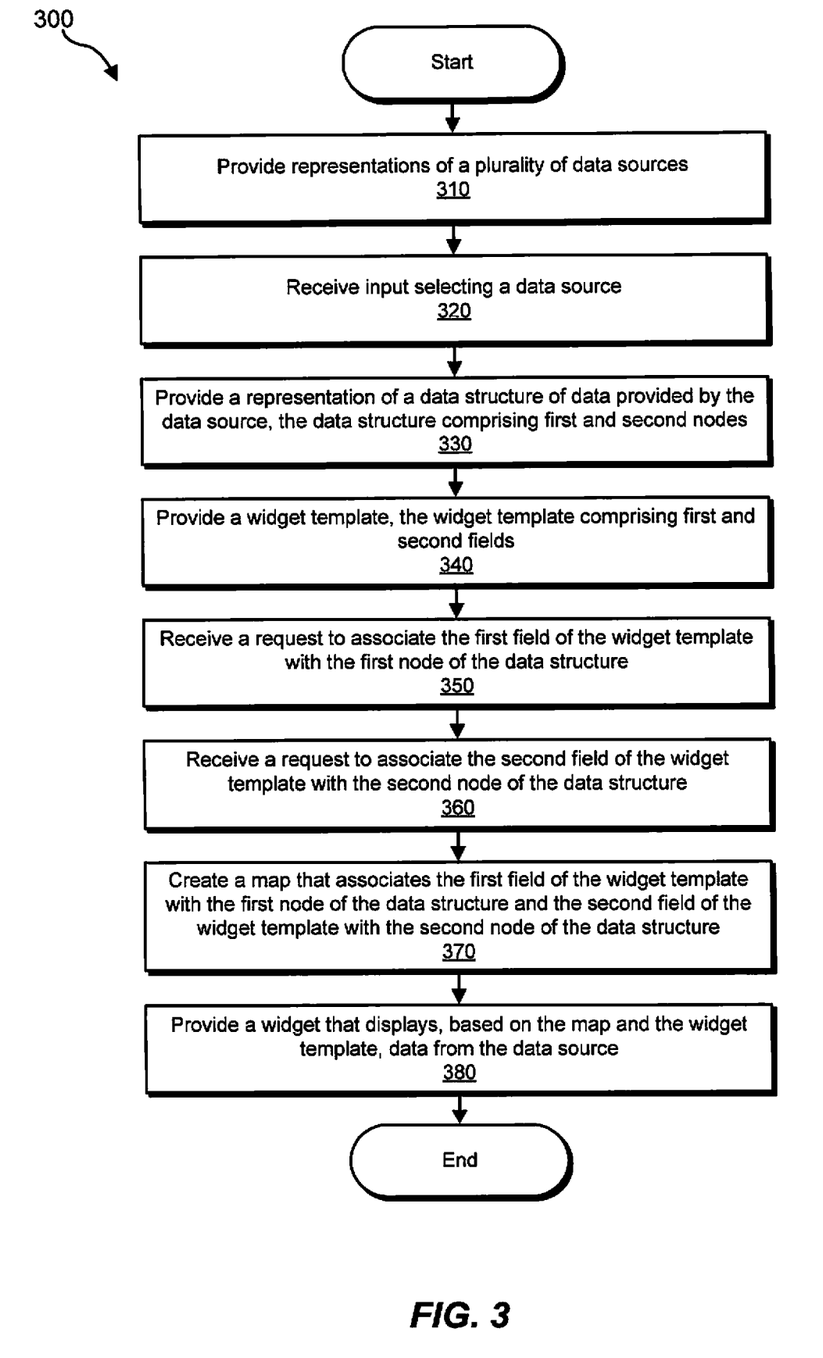
FIG. 3 is a flow diagram of another exemplary method for developing widgets.

FIG. 3 shows another exemplary method 300 for developing a widget. The steps shown in FIG. 3 may be performed by any suitable hardware, computing instructions, or combination thereof. For example, development subsystem 120 may perform one or more of the steps illustrated in FIG. 3. In one example, development subsystem 120 may provide graphical representations of a plurality of data sources (step 310). Development subsystem 120 may provide the representations of the plurality of data sources by sending the representations to a display device (e.g., a display device connected to access subsystem 110 or a display device directly connected to development subsystem 120) configured to display the representations for viewing by a user. The plurality of data sources may include data source 130.

The user may select data source 130 from the plurality of data sources, and development subsystem 120 may receive input indicating the user's selection of data source 130 from the plurality of data sources (step 320). In response to the user's selection, development subsystem 120 may provide a graphical representation of a data structure of data provided by data source 130 (step 330). The data structure may include at least first and second nodes, For example, development subsystem 120 may send the representation of the data structure to the display device viewable by the user. Development subsystem 120 may also provide a widget template having first and second fields (step 340). In some embodiments, development subsystem 120 may provide graphical representations of the data structure and the widget template for display in the same GUI.

In certain embodiments, development subsystem 120 may be configured to provide more than one widget template. For example, development subsystem 120 may provide graphical representations of multiple widget templates to access subsystem 110, and a user may select a widget template (or multiple widget templates) from the group of widget templates for use in developing a widget.

Development subsystem 120 may receive a request to associate the first field of the widget template with the first node of the data structure (step 350). For example, the user may view the GUI with representations of the data structure and the widget template displayed therein and may interact with the GUI to request association of the first node of the data structure with the first field of the widget template. In some embodiments, development subsystem 120 may also receive a request to associate the second field of the widget template with the second node of the data structure (step 360). For example, the user may interact with the GUI to request association of the second node of the data structure with the second node of the widget template.

Development subsystem 120 may create a map that associates the first field of the widget template with the first node of the data structure and the second field of the widget template with the second node of the data structure (step 370). The map may be created using any suitable process and/or any suitable data structure. For example, the map may be created using any process and/or data structure presented in the discussion of step 240 of FIG. 2. After creating the map, development subsystem 120 may provide a widget that displays, based on the map and the widget template, data from data source 130 (step 380). The widget may be provided in any suitable manner. For example, the widget may be provided using any process discussed in step 250 of FIG. 2.

Figure 4:
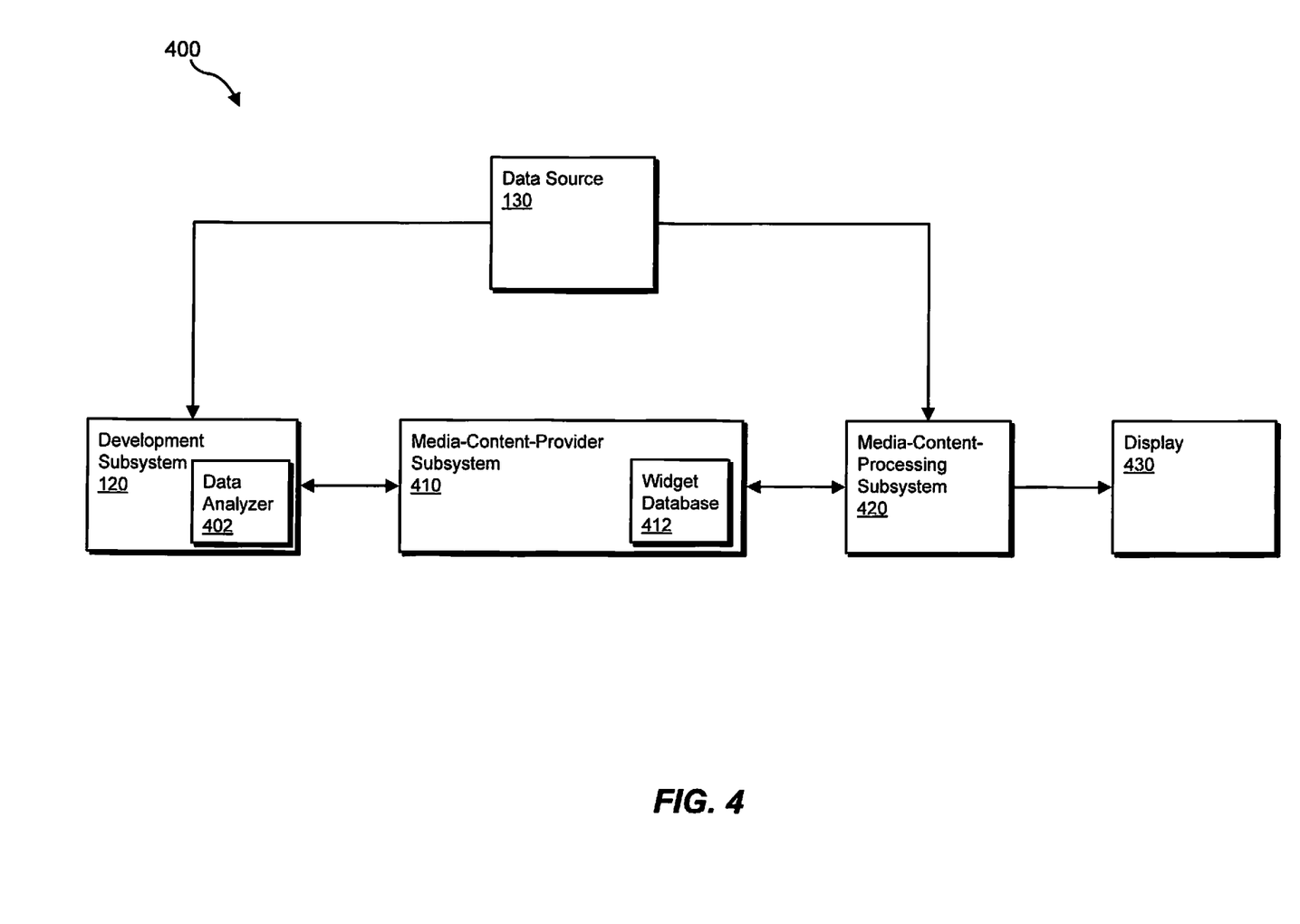
FIG. 4 is a block diagram of an exemplary system for distributing widgets.

FIG. 4 shows another exemplary system 400 for developing a widget. System 400 may include development subsystem 120, which may include a data analyzer 402. Development subsystem 120 may be in communication with data source 130 and a media-content-provider subsystem 410. Media-content-provider subsystem 410 may include a widget database 412 and may be in communication with a media-content-processing system 420. Media-content-processing subsystem 420 may be in communication with data source 130 and a display 430. The components of system 400 may communicate using any known communication technologies, devices, networks, media, and protocols supportive of remote data communications, including, but not limited to, any of those disclosed herein.

As mentioned above, development subsystem 120 may include a data analyzer 402. Data analyzer 402 may be configured to analyze a format of data provided by a data source, such as data source 130. Data analyzer 402 may use any suitable process for analyzing data from data source 130. For example, if data source 130 provides XML data, data analyzer 402 may identify one or more nodes of a data structure of the XML data. The nodes may be identified by parsing tags and/or other information in an XML document from data source 130. Development subsystem 120 may then present graphical representations of the nodes of the data structure to a user during a widget development process.

In some embodiments, development subsystem 120 may send one or more widgets developed on widget development subsystem 120 to media-content-provider subsystem 410. Media-content-provider subsystem 410 may store one or more widgets received from development subsystem 120 in widget database 412, and media-content-provider subsystem 410 may provide one or more of the widgets stored in widget database 412 to media-content-processing subsystem 420. In other embodiments, development subsystem 120 may send widgets directly to media-content-processing subsystem 420. For example, a home computer of a user may include development subsystem 120, and a set-top box belonging to the user may include media-content-processing subsystem 420. The user may develop a widget on the home computer and may send the widget from the home computer to the set-top box.

In some embodiments, media-content-provider subsystem 410 may publish a widget directory. For example, media-content-provider subsystem 410 may provide a widget directory that shows one or more widgets available for access and/or download. Media-content-provider subsystem 410 may send the directory to media-content-processing subsystem 420, and media-content-processing subsystem 420 may display the directory on display 430. A user may view the widget directory and select a widget. In response, media-content-provider subsystem 410 may send the widget to media-content-processing subsystem 420.

Media-content-provider subsystem 410 may customize a widget directory for a particular user. For example, media-content-provider subsystem 410 may provide a user with a widget directory that includes one or more widgets associated with a region where the user lives. As another example, media-content-provider subsystem 410 may provide a widget directory that is based on a user's preferences and/or content-viewing habits.

In some embodiments, media-content-provider subsystem 410 may provide widgets for free. In other embodiments, media-content-provider subsystem 410 may charge a fee for one or more widgets. In certain embodiments, media-content-provider subsystem 410 may track download statistics for one or more widgets that were created by an advertiser. The download statistics may be used to collect advertising revenue from the advertiser.

Media-content-provider subsystem 410 may include one or more media servers and/or other devices configured to provide media content to other devices. For example, media-content-provider subsystem 410 may be configured to provide video data, audio data, and/or any other type of media content to media-content-processing subsystem 420. Media-content-provider subsystem 410 may communicate with media-content-processing subsystem 420 using any network technology mentioned above (e.g., a Verizon® FIOS® network). In some alternative examples, media-content-provider subsystem 410 may be connected directly to media-content-processing subsystem 420.

Media content processing subsystem 420 may be configured to process a media content stream provided by media-content-provider subsystem 410, including causing a media content instance, or one or more components (e.g., video and/or audio components) of a media content instance, to be presented for experiencing (e.g., viewing) by a user. The term "media content instance" as used herein refers generally to any television program, on demand program, pay-per-view program, broadcast media program, IPTV content, commercial, advertisement, video, movie, song, video game, image, photograph, sound, widget, or any segment, component, or combination of these or other forms of media content that may be viewed or otherwise experienced by a user.

Presentation of the media content instance may include, but is not limited to, displaying, playing back, or otherwise processing the media content instance, or one or more components of the media content instance, such that the media content instance may be experienced by the user. For example, media-content-processing subsystem 420 may process a widget executable, a map, and/or a widget template to render a widget. Media-content-processing subsystem 420 may provide one or more signals to a display 430 (e.g., a television, computer monitor, etc.) so that display 430 may present (e.g., display) media content, such as a widget, for experiencing by the user.

As will be described in more detail below, media-content-processing subsystem 420 may be at least partially controlled by a user input device (e.g., a remote control device). In certain examples, a user input device may include input mechanisms by which a user can utilize features and/or services provided by media-content-processing subsystem 420 to navigate within various interactive GUIs that may be provided by media-content-processing subsystem 420.

Systems presented in the instant disclosure, such as systems 100 and 400, are also referred to herein as computing systems. In some examples, system 100, system 400, or one or more components of systems 100 and/or 400, may include any computer hardware and/or instructions (e.g., software programs), or combinations of software and hardware, configured to perform one or more of the processes described herein. In particular, it should be understood that components of systems 100 and 400 may include and/or may be implemented on one physical computing device or may include and/or may be implemented on more than one physical computing device. Accordingly, systems 100 and/or 400 may include any number of computing devices, and may employ any number of computer operating systems.

Accordingly, one or more of the processes described herein may be implemented at least in part as computer-executable instructions, i.e., instructions executable by one or more computing devices, tangibly embodied in a computer-readable medium. For example, such instructions may include one or more software, middleware, and/or firmware application programs tangibly embodied in one or more computer-readable media and configured to direct one or more computing devices to perform one of more of the processes described herein. In general, a processor (e.g., a microprocessor) receives instructions, from a computer-readable medium (e.g., from a memory), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 5:
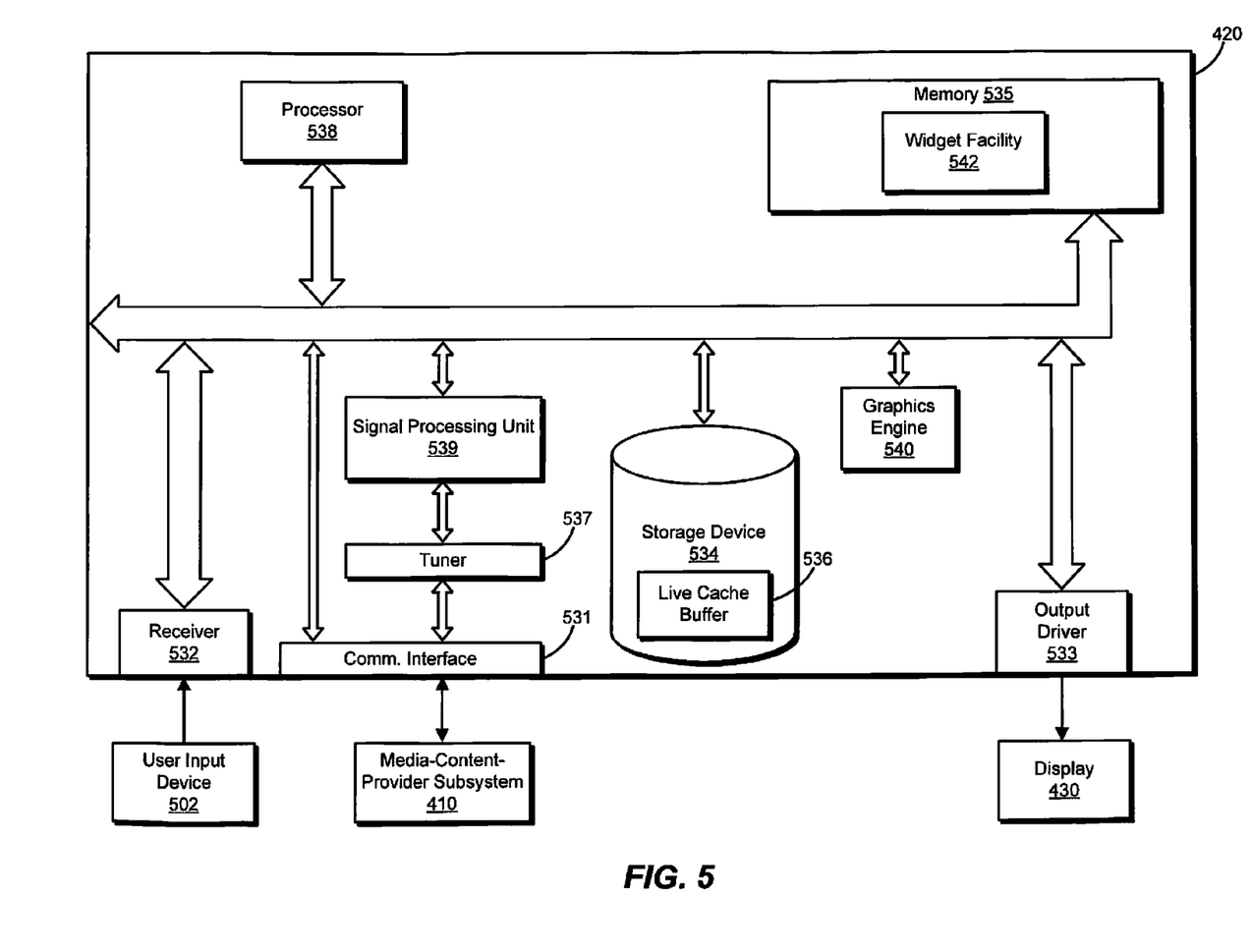
FIG. 5 is a block diagram of an exemplary media-content-processing subsystem.

FIG. 5 illustrates exemplary components of media-content-processing subsystem 420. Media-content-processing subsystem 420 may include any hardware, software, and firmware, or combination or sub-combination thereof, configured to process media content and/or one or more widgets for presentation to a user. The media content and/or widgets may be received from media-content-provider subsystem 410 and provided to display 430 for presentation to the user. As used herein and in the appended claims, unless otherwise specifically denoted, the term "media-content-processing subsystem" refers expansively to all possible receivers configured to receive and process digital and/or analog media content, as well as widgets. Media-content-processing subsystem 420 may include, but is not limited to, a set-top box ("STB"), home communication terminal ("HCT"), digital home communication terminal ("DHCT"), stand-alone personal video recorder ("PVR"), DVD player, handheld entertainment device, gaming device, video-enabled phone (e.g., a mobile phone), and personal computer.

In certain embodiments, media-content-processing subsystem 420 may include any computer hardware and/or instructions (e.g., software), or combinations of software and hardware, configured to perform the processes described herein. In particular, it should be understood that media-content-processing subsystem 420 may be implemented on one physical computing device or may be implemented on more than one physical computing device. Accordingly, media-content-processing subsystem 420 may include any one of a number of computing devices, and may employ any of a number of computer operating systems, including, but by not limited to, known versions and/or varieties of MICROSOFT WINDOWS, UNIX, MACINTOSH, and LINUX operating systems.

While an exemplary media-content-processing subsystem 420 is shown in FIG. 5, the exemplary components illustrated in FIG. 5 are not intended to be limiting. Additional or alternative components and/or implementations may be used in other embodiments. Components of media-content-processing subsystem 420 will now be described in additional detail.

As shown in FIG. 5, a user input device 502 may be in communication with media-content-processing subsystem 420 and may control one or more functions of media-content-processing subsystem 420. Media-content-processing subsystem 420 may provide one or more media-processing functions. For example, media-content-processing subsystem 420 may include a communication interface 531 configured to receive content (e.g., media content) and/or data (e.g., widgets) in any acceptable format from media-content-provider subsystem 410 or from any other suitable content source. Communication interface 531 may include any device, logic, and/or other technologies suitable for receiving signals and/or data representative of media content and/or other types of content or data. Communication interface 531 may be configured to interface with any suitable communication media, protocols, and formats, including any of those mentioned above.

Media-content-processing subsystem 420 may also include a receiver 532 configured to receive user input signals (e.g., a request to download a widget) from user input device 502. User input device 502 may include, for example, a remote control device or any other suitable input device and may be configured to communicate with receiver 532 via a wireless link, electrical connection, or any other suitable communication link.

Media-content-processing subsystem 420 may include an output driver 533 configured to interface with or drive display 430. As instructed by one or more processors of media-content-processing subsystem 420, output driver 533 may provide output signals to display 430, the output signals including content (e.g., media content and/or widgets) to be presented by display 430 for experiencing by a user. For example, output driver 533 may provide a widget to display 430 for presentation to the user. Output driver 533 may include any combination of hardware, software, and/or firmware as may serve a particular application.

Storage device 534 may include one or more data storage media, devices, or configurations and may employ any type, form, and combination of storage media. For example, storage device 534 may include, but is not limited to, a hard drive, network drive, flash drive, magnetic disc, optical disc, or other non-volatile storage unit. Media content, widgets, and other data may be temporarily and/or permanently stored in storage device 534.

Storage device 534 is shown to be a part of the media-content-processing subsystem 420 in FIG. 5 for illustrative purposes only. It will be understood that storage device 534 may additionally or alternatively be located external to media-content-processing subsystem 420.

Media-content-processing subsystem 420 may include memory 535. Memory 535 may include, but is not limited to, FLASH memory, random access memory ("RAM"), dynamic RAM ("DRAM"), other suitable computer-readable media, or any combination or sub-combination thereof. In some examples, various facilities used by media-content-processing subsystem 420 may reside in memory 535.

Storage device 534 may include one or more live cache buffers 536. Live cache buffer 536 may additionally or alternatively reside in memory 535 or in a storage device external to media-content-processing subsystem 420. In some examples, media content and/or widgets may be temporarily stored in live cache buffer 536 to facilitate viewing of the media content and/or widget content.

Tuner 537 may be configured to selectively receive content (e.g., media content) carried on a particular content channel. For example, tuner 537 may be tuned to a particular content channel such that the content carried on the content channel is received and may be processed by media-content-processing subsystem 420.

In some examples, media-content-processing subsystem 420 may include multiple tuners 537 such that content carried on different content channels may be concurrently received by media-content-processing subsystem 420. For example, media-content-processing subsystem 420 may include a first tuner configured to receive content carried on an analog video signal and a second tuner configured to simultaneously receive content carried on a digital compressed signal.

In some examples, media content received at the tuner 537 is temporarily buffered, or stored, in the live cache buffer 536. If there are multiple tuners 537, there may be a live cache buffer 536 corresponding to each of the tuners 537.

While tuner 537 may be used to receive various types of content-carrying signals broadcast by media-content-provider subsystem 410, media-content-processing subsystem 420 may be configured to receive other types of content signals (including media content signals and/or widget data signals) from media-content-provider subsystem 410 and/or other sources without using a tuner. For example, media-content-provider subsystem 410 may broadcast digital streams of data packets (e.g., Internet Protocol ("IP") based data packets) that can be received without using a tuner. For such types of content signals, communication interface 531 may receive and forward the signals directly to other components of media-content-processing subsystem 420 (e.g., processor 538 or signal processing unit 539) without the signals going through tuner 537. For an IP-based signal, for example, signal processing unit 539 may function as an IP receiver.

Media-content-processing subsystem 420 may include at least one processor, such as processor 538, configured to control operations of media-content-processing subsystem 420. Media-content-processing subsystem 420 may also include a signal processing unit 539 configured to process incoming media content. Signal processing unit 539 may be configured, for example, to demodulate and parse encoded digital media content. In some examples, media-content-processing subsystem 420 may include one or more signal processing units 539 corresponding to each of the tuners 537. Widget executables, widget templates, and/or maps received from media-content-provider subsystem 410 may be processed by signal processing unit 539, processor 538, and/or any other suitable component(s) of media-content-processing subsystem 420.

Media-content-processing subsystem 420 may include a graphics engine 540 configured to generate graphics that can be displayed by the display 430. The graphics may include graphical user interfaces such as, but not limited to, one or more GUIs within which one or more widgets may be displayed.

One or more facilities (e.g., software applications) residing within media-content-processing subsystem 420 may be executed upon initiation by a user of the media-content-processing subsystem 420, or upon the occurrence of another predetermined event. The facilities may reside in memory 535 or in any other area of the media-content-processing subsystem 420 and may be executed by processor 538.

As shown in FIG. 5, media-content-processing subsystem 420 may include a widget facility 542, which may reside in memory 535. Widget facility 542 may be configured to instruct one or more components of media-content-processing subsystem 420 (e.g., processor 538 and/or graphics engine 540) to generate and provide data representative of a widget. Media-content-processing subsystem 420 may provide the widget to display 430 for presentation to a user in a GUI.

Widget facility 542 may be launched or executed by receipt of a predetermined user input signal. For example, when a user selects a "display widget" button of user input device 502, widget facility 542 may launch and instruct processor 538 and/or graphics engine 540 to display one or more widgets. The widget may be provided to output driver 533, which may provide a signal including data representative of the widget to display 430 for presentation to the user.

Figure 6:
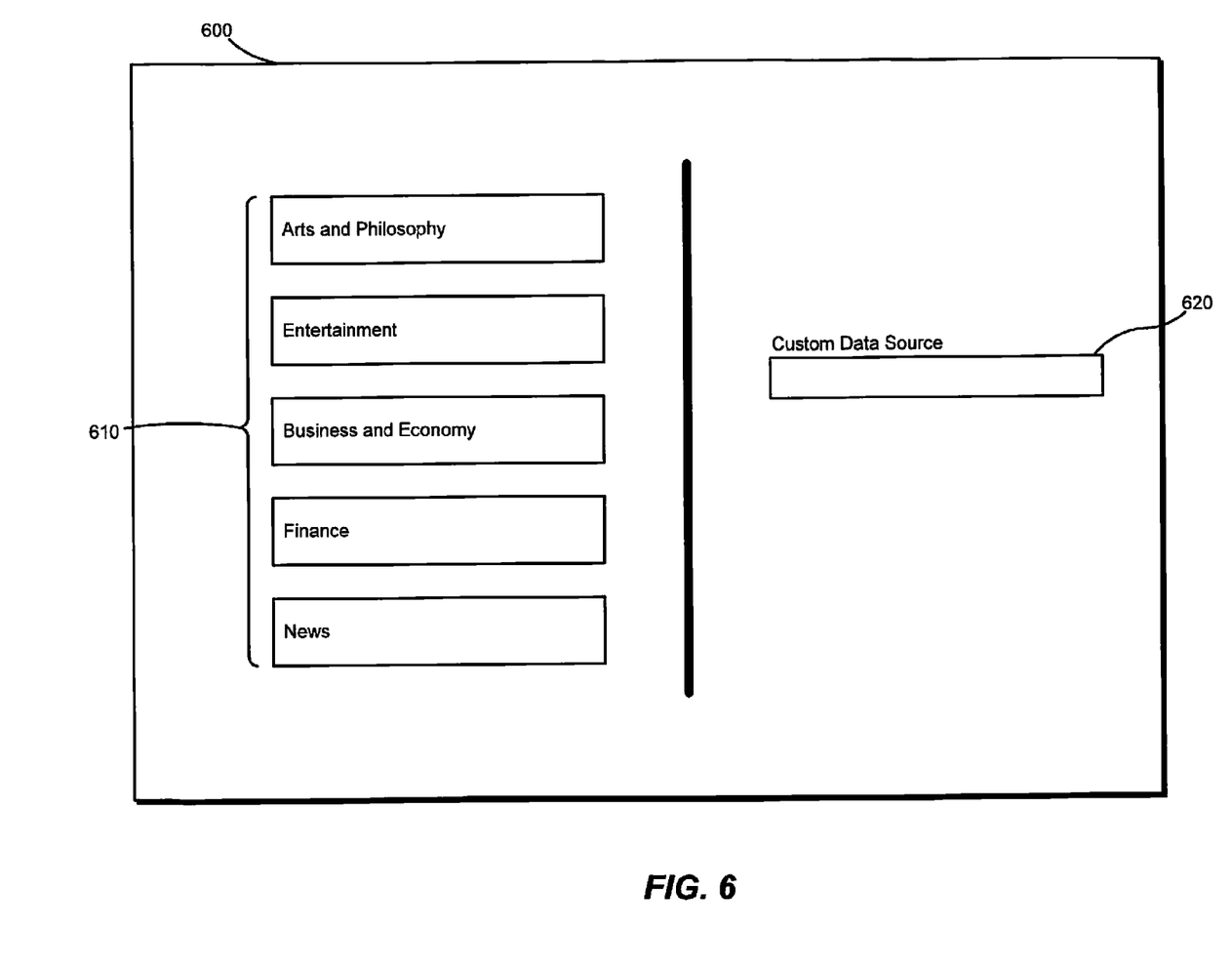
FIG. 6 is a block diagram of an exemplary GUI for developing widgets.
Figure 7:
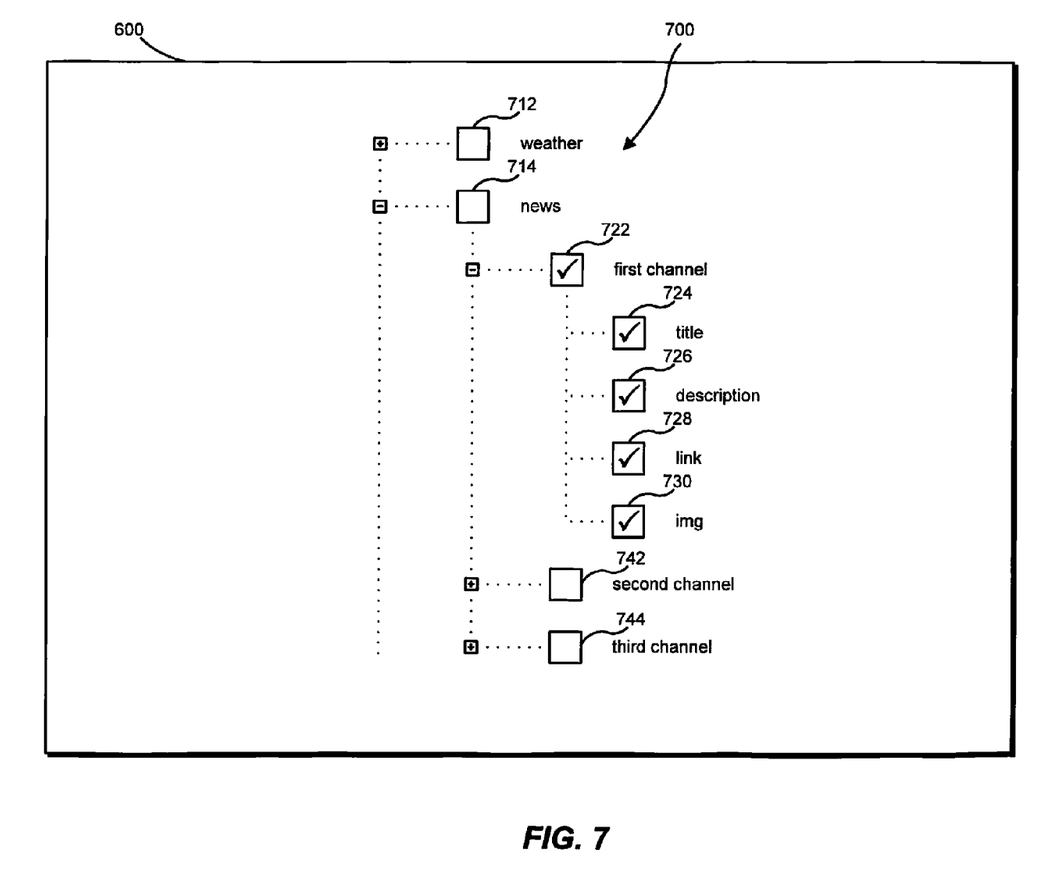
FIG. 7 is another block diagram of the exemplary GUI shown in FIG. 6.
Figure 8:
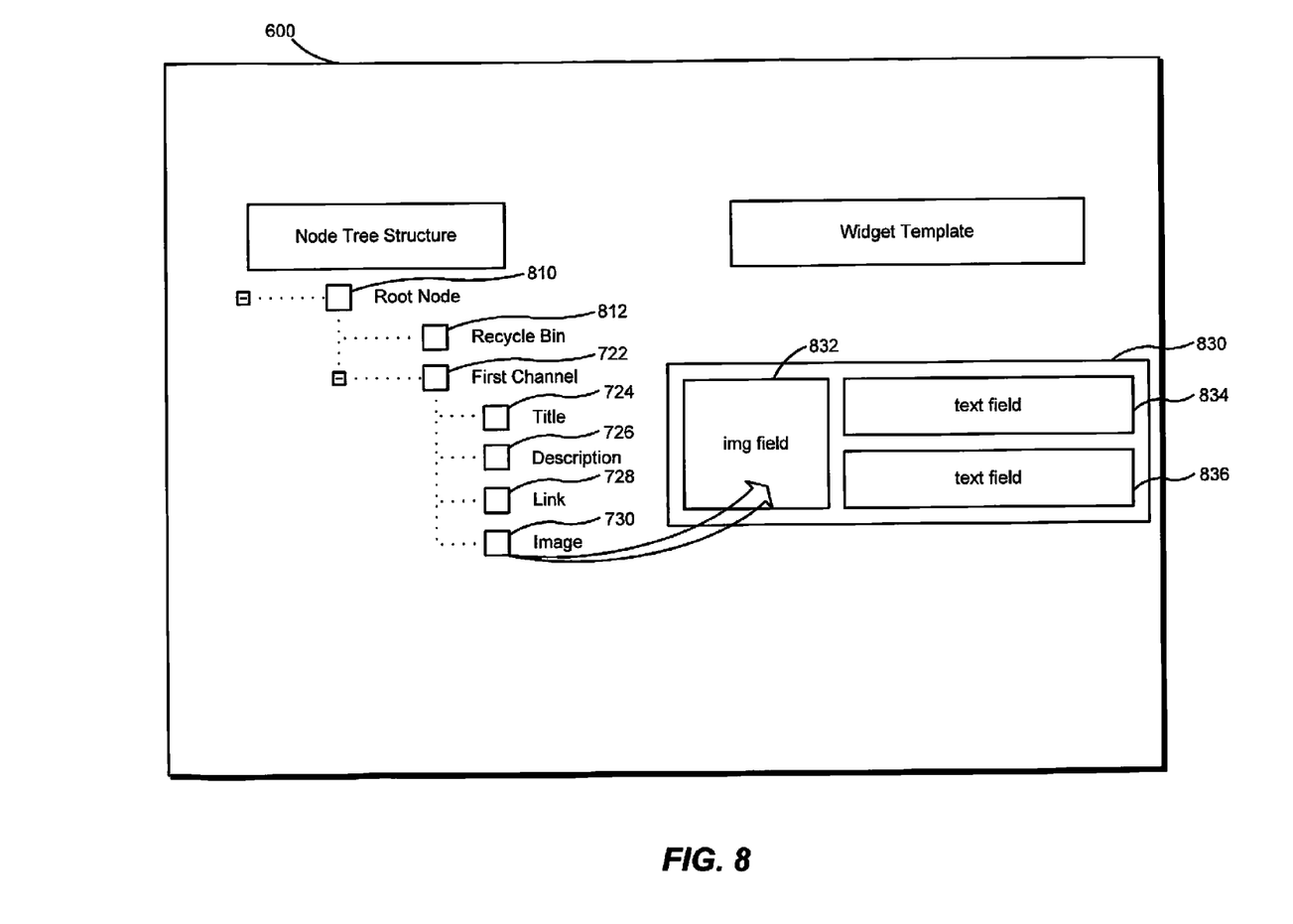
FIG. 8 is another block diagram of the exemplary GUI shown in FIG. 6.

FIGS. 6-8 illustrate an example of how a user may interact with a GUI to develop a widget. FIG. 6 shows an exemplary widget-development GUI 600, which may be provided by development subsystem 120. Widget-development GUI 600 may display data-source categories 610 and an input field 620. Data-source categories, such as data-source categories 610 may include any suitable category and/or subcategory of one or more data sources. For example, as shown in FIG. 6, data source categories 610 may include an arts-and-philosophy category, an entertainment category, a business-and-economy category, a finance category, and a news category.

A user may select one or more of the categories displayed in widget-development GUI 600. After a user selects a category, widget-development GUI 600 may display sub-categories and/or data sources associated with the selected category. A user may select one or more of the data sources (not shown) displayed in widget-development GUI 600. In some embodiments, instead of or in addition to selecting a data source displayed in widget-development GUI 600, a user may enter input identifying a data source in input field 620. For example, a user may enter a URL associated with (e.g., pointing to) a data source in input field 620.

After the user selects one or more data sources, a data analyzer, such as data analyzer 402, may identify one or more data structures of data associated with the data source(s) selected by the user. For example, data analyzer 402 may identify one or more nodes of a data structure of a data source selected by a user.

A data structure may include any suitable organization of data. For example, a data structure may include a tree or a linked list. In some embodiments, a data structure may include one or more nodes. A node of a data structure may be any unit or placeholder of data in a data structure. In markup-language documents, nodes may include or may be defined by tags. For example, an RSS feed, which may be implemented in XML, may include one or more channel nodes. A channel node may include one or more sub-nodes associated with one or more items related to the channel, such as a title of the channel, a description of the channel, a link to the channel, a link to an image, and/or any other suitable data field. Items provided through a channel may also include one or more nodes. An item node may include a title of the item, a description of the item, a link to the item, a link to an image, and/or any other suitable data field.

Development subsystem 120 may cause widget-development GUI 600 to display one or more data structures. For example, if a user selects a weather data source and a news data source from a group of data sources, widget-development GUI 600 may display a tree structure 700 that represents data structures from these sources, as shown in FIG. 7. Tree structure 700 may include a weather node 712, which may be associated with the weather data source, and a news node 714, which may be associated with the news data source.

The news data source may include a first channel, which may be represented in tree structure 700 as a first channel node 722. Tree structure 700 may also display nodes associated with an item provided through the first channel of the news data source. For example, tree structure 700 may include a title node 724, a description node 726, a link node 728, and an image node 730.

A data source, such as the news data source, may provide multiple channels. For example, the news data source may include second and third channels, which may be represented by a second channel node 742 and a third channel node 744, respectively. In some embodiments, a channel may also be referred to as a data source.

A user may view tree structure 700 in GUI 600 and may select one or more nodes of tree structure 700. For example, a user may select one or more channel nodes and/or one or more item nodes associated with one or more data sources. By selecting a node, the user may indicate that the user wants to be able to associate the node with a field in a widget template. As shown in FIG. 7, a user may select first channel node 722, title node 724, description node 726, link node 728, and image node 730.

After a user selects one or more nodes, development subsystem 120 may cause GUI 600 to display the selected nodes together with a widget template. For example, as shown in FIG. 8, widget-development GUI 600 may display a root node 810 that may expand to display the nodes selected by the user (e.g., first channel node 722, title node 724, description node 726, link node 728, and image node 730). Root node 810 may also expand to display a recycle bin 812. In addition to displaying the selected nodes, widget-development GUI 600 may display a widget template 830, which may include one or more spatially arranged fields such as an image field 832, a text field 834, and a text field 836.

The user may interact with widget-development GUI 600 to associate one or more of the nodes displayed in widget-development GUI 600 with one or more of the fields of widget template 830. For example, the user may associate title node 724 with text field 834 by dragging a visual representation of title node 724 to text field 834 and dropping title node 724 into text field 834. In some embodiments, the user may use any other suitable input to associate title node 724 with text field 834. The user may also associate other nodes with other fields, such as by associating image node 730 with image field 832 and description node 726 with text field 836. In response to the user's input, development subsystem 120 may create a map that associates title node 724 with text field 834, image node 730 with image field 832, and description node 726 with text field 836. The map may be used in any of the ways described above to generate and provide a custom widget for display.

At any suitable point during widget development, data representative of a widget may be provided to a simulation subsystem. For example, the widget may be compiled and provided to the simulation subsystem. In other embodiments, a widget template and/or map may be provided to the simulation subsystem. The simulation subsystem may display a GUI within a simulated environment of one or more platforms. The simulation subsystem may be provided as a standalone system or may be included in access subsystem 110, development subsystem 120, end-user subsystem 140, and/or in any other suitable subsystem.

Figure 9:
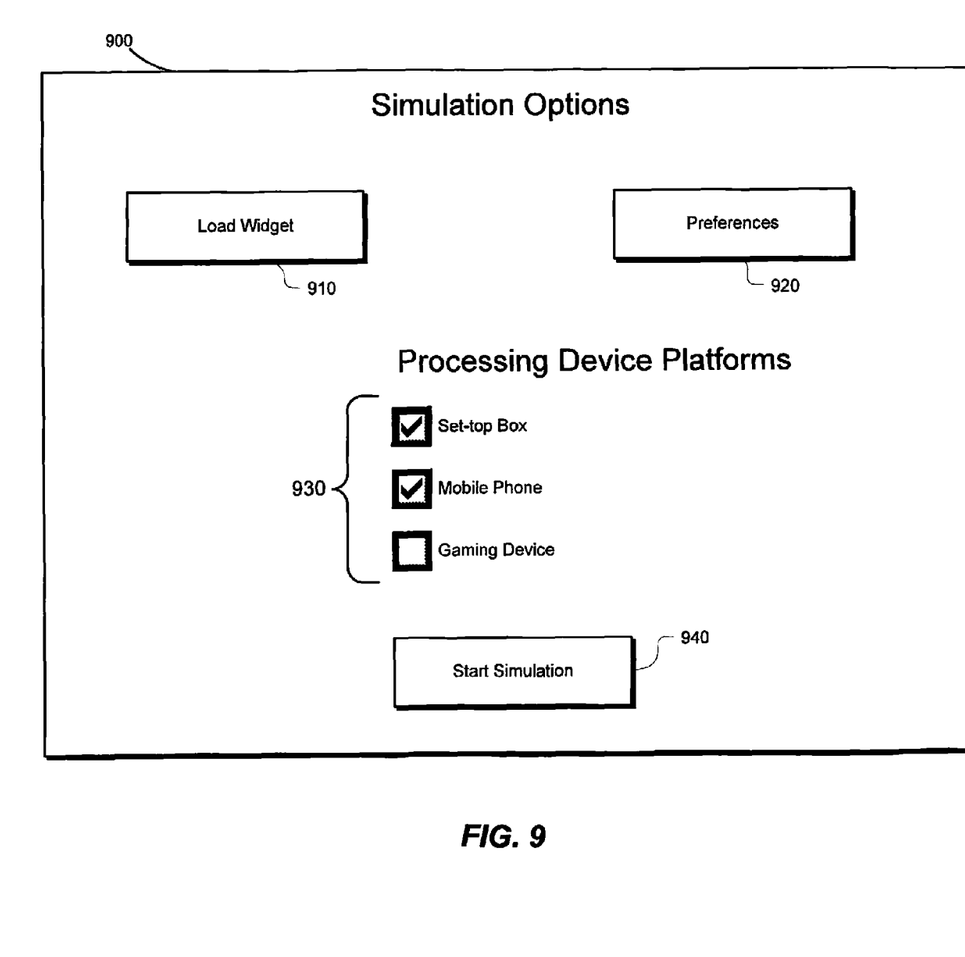
FIG. 9 is a block diagram of an exemplary GUI for simulating display of a widget.

FIG. 9 shows an exemplary simulation GUI 900 provided by a simulation subsystem. Simulation GUI 900 may provide a user with one or more selectable options corresponding to a simulation of a widget. It will be recognized that the options shown in simulation GUI 900 are merely illustrative and that additional or alternative options may be included for a particular widget and/or platform.

As shown in FIG. 9, a user may select option 910 to load a widget into the simulation subsystem. The simulation subsystem may load the widget in any suitable manner. Option 920 may be selected to configure one or more simulation preferences. Such simulation preferences may include, but are not limited to, input preferences, output preferences, reporting preferences, interface preferences, display preferences, etc.

As shown in FIG. 9, a user may select one or more platforms 930 within which the widget will be simulated. Each platform 930 may correspond to a particular type of processing device. For example, the platforms 930 shown in FIG. 9 include a set-top box platform, a mobile phone platform, and a gaming device platform. Other platforms 930 corresponding to other types of processing devices may additionally or alternatively be included within simulation GUI 900.

When a particular processing device platform 930 is selected, the simulation subsystem may simulate display and/or functionality of a widget by one or more of the selected platforms. For example, a set-top box platform and a mobile phone platform are selected in simulation GUI 900. In this configuration, when the user selects option 940 to begin simulation, the simulation subsystem may simulate display and/or functionality of the widget by a set-top box and mobile phone.

To facilitate simulation of a widget on a particular platform, the simulation subsystem may be configured to emulate the platform. For example, the simulation subsystem may emulate an environment, display, operation, function, and/or any other feature of a platform. In some examples, one or more components of the simulation subsystem may be configured to generate and display a graphical representation of a display screen that includes the widget. In such embodiments, a developer may see how the graphics associated with the widget would be rendered and displayed by a particular platform.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

What is claimed is:

1. A method comprising:
 receiving, by a development subsystem, input identifying a first data source;
 providing, by the development subsystem, a widget template;
 receiving, by the development subsystem, a first request to associate the first data source with the widget template;
 creating, by the development subsystem, a map that associates the first data source with the widget template;
 receiving, by the development subsystem, a user selection indicating at least one media-content-processing subsystem;
 creating, by the development subsystem and based on the widget template, the map, and the user selection indicating the at least one media-content-processing subsystem, a widget configured for the at least one user selected media-content-processing subsystem; and
 providing, by the development subsystem, the widget to the at least one user selected media-content-processing subsystem for installation on the at least one user selected media-content-processing subsystem, the media-content-processing subsystem including at least one of a set-top box, a mobile phone, and a gaming device and programmed to provide the widget for presentation to a user.

2. The method of claim 1, wherein:
data from the first data source is organized in a data structure;
the data structure comprises first and second nodes; and
creating the map that associates the first data source with the widget template comprises:
mapping the first node of the data structure to a first field of the widget template; and
mapping the second node of the data structure to a second field of the widget template.

3. The method of claim 2, wherein:
the first data source comprises a web-feed source;
the data structure of the data from the data source comprises a markup-language-document structure;
the first node of the data structure comprises a first markup-language tag; and
the second node of the data structure comprises a second markup-language tag.

4. The method of claim 2, further comprising analyzing the data from the first data source to identify the first and second nodes of the data structure.

5. The method of claim 1, further comprising receiving a second request to associate a second data source with the widget template, wherein:
receiving the first request to associate the first data source with the widget template comprises receiving a request to associate the first data source with a first field of the widget template;
receiving the second request to associate the second data source with the widget template comprises receiving a request to associate the second data source with a second field of the widget template.

6. The method of claim 1, wherein providing the widget to the at least one media-content-processing subsystem includes publishing the widget to a directory of widgets.

7. The method of claim 1, further comprising displaying a plurality of data sources, wherein:
the plurality of data sources comprises the first data source; and
receiving the input identifying the first data source comprises receiving input selecting the first data source from the plurality of data sources.

8. The method of claim 1, wherein receiving the input identifying the first data source comprises receiving a uniform resource locator of the first data source.

9. The method of claim 1, tangibly embodied as computer-executable instructions on at least one non-transitory computer-readable medium.

10. A system comprising:
a development subsystem including a processor programmed to:
receive input identifying a first data source;
maintain a widget template;
receive a request to associate the first data source with the widget template;
create a map that associates the first data source with the widget template;
receive a user selection indicating at least one media-content-processing subsystem;
create, based on the widget template, the map and the user selection indicating the at least one user selected media-content-processing subsystem, a widget configured for the at least one user selected media-content-processing subsystem; and
provide the widget to the at least one user selected media-content-processing subsystem for installation on the at least one user selected media-content-processing subsystem, the media-content-processing subsystem including at least one of a set-top box, a mobile phone, and a gaming device;
the media-content-processing subsystem in communication with the development subsystem and programmed to:
receive the widget;
receive data from the first data source; and
render the widget to display the data from the first data source on a display device.

11. The system of claim 10, wherein the development subsystem is programmed to provide the map to the media-content-processing subsystem over a network.

12. The system of claim 10, further comprising a media-content-provider subsystem in communication with the development subsystem and the media-content-processing subsystem, the media-content-provider subsystem programmed to:
receive the map from the development subsystem;
receive a request from the media-content-processing subsystem to download the widget; and
send the map to the media-content-processing subsystem in response to the request to the widget.

13. The system of claim 10, further comprising a media-content-provider subsystem in communication with the development subsystem and the media-content-processing subsystem, the media-content-provider subsystem being programmed to:
add the widget to a database of widgets;
provide the media-content-processing subsystem with information associated with at least one widget from the database of widgets in response to a request from the media-content-processing subsystem to view a directory of widgets.

14. The system of claim 10, wherein:
the data from the first data source comprises a data structure having first and second nodes;
the development subsystem comprises a data-source analyzer programmed to identify the first and second nodes of the data structure;
the widget template comprises a first field and a second field; and
the development subsystem is programmed to create the map by mapping the first node to the first field of the widget template and mapping the second node to the second field of the widget template.

15. The system of claim 10, wherein the development subsystem is programmed to:
receive input identifying a second data source;
receive a request to associate the second data source with the widget template.

16. A system comprising:
a development subsystem including a processor programmed to:
provide a Graphical User Interface ("GUI") for display on a display device;
provide, for inclusion in the GUI, a graphical representation of a data source;
provide, for inclusion in the GUI, a graphical representation of a widget template;
provide, for inclusion in the GUI, a mapping mechanism configured to facilitate creation of a map that associates the data source with the widget template;

receive a user selection, via the GUI, indicating at least one media-content-processing subsystem;

create, based on the widget template, the map, and the user selection indicating the at least one user selected media-content-processing subsystem, a widget configured for the at least one user selected media-content-processing subsystem; and provide the widget to the at least one user selected media-content-processing subsystem for installation on the at least one user selected media-content-processing subsystem, the media-content-processing subsystem including at least one of a set-top box, a mobile phone, and a gaming device.

17. The system of claim 16, wherein the development subsystem is programmed to provide, for inclusion in the GUI, a graphical representation of a data structure of data from the data source.

18. The system of claim 17, further comprising:
a network interface configured to receive data from the data source; and
a data-source analyzer programmed to identify the data structure of the data from the data source.

19. The system of claim 16, wherein the graphical representation of the widget template comprises at least one customizable field.

20. A method comprising:
displaying, by a development subsystem, a representation of a widget template, the widget template comprising first and second fields;

displaying, by the development subsystem, a plurality of data sources, the plurality of data sources comprising a first data source;

receiving, by the development subsystem, input selecting the first data source;

displaying, by the development subsystem, a data structure of data provided by the first data source, the data structure comprising first and second nodes;

receiving, by the development subsystem, a request to associate the first field of the widget template with the first node of the data structure;

receiving, by the development subsystem, a request to associate the second field of the widget template with the second node of the data structure;

creating, by the development subsystem, a map that associates the first field of the widget template with the first node of the data structure and the second field of the widget template with the second node of the data structure;

receiving, by the development subsystem, a user selection indicating at least one media-content-processing subsystem;

creating, by the development subsystem and based on the widget template, the map, and the user selection indicating the at least one media-content-processing subsystem, a widget configured for the at least one user selected media-content-processing subsystem; and providing, by the development subsystem, the widget to the at least one user selected media-content-processing subsystem for installation on the at least one user selected media-content-processing subsystem, the media-content-processing subsystem including at least one of a set-top box, a mobile phone, and a gaming device and programmed to provide the widget for presentation to a user.

21. The method of claim 20, wherein:
the media-content-processing subsystem is programmed to provide the widget to a display for presentation to the user.

* * * * *